United States Patent
Lucas

[11] Patent Number: 5,921,600
[45] Date of Patent: Jul. 13, 1999

[54] DUAL HANDLED SHOVEL

[76] Inventor: Michael J. Lucas, 741 Atlantic Ave., Sewell, N.J. 08080

[21] Appl. No.: 09/065,303

[22] Filed: Apr. 23, 1998

[51] Int. Cl.[6] ................................ A01B 1/22; B25G 3/38
[52] U.S. Cl. .............................................. 294/58
[58] Field of Search ................. 294/54.5, 57–59; 16/111 R, 114 R, 115; 37/265, 285; 254/131.5

[56]  References Cited

U.S. PATENT DOCUMENTS

| | | | |
|---|---|---|---|
| 911,291 | 2/1909 | Byor | 294/58 |
| 1,456,879 | 5/1923 | Newman | 294/58 |
| 2,772,910 | 12/1956 | Doyle | 294/58 |
| 4,050,728 | 9/1977 | Davidson | 294/58 |
| 4,229,033 | 10/1980 | Vosbikian | 294/58 |
| 4,264,096 | 4/1981 | Barnett | 294/58 |
| 4,615,553 | 10/1986 | Hultine | 294/58 |
| 4,787,661 | 11/1988 | Rutledge | 294/58 |
| 4,944,541 | 7/1990 | Waldschmidt | 294/58 |
| 5,447,349 | 9/1995 | Coble | 294/58 |

FOREIGN PATENT DOCUMENTS

| | | | |
|---|---|---|---|
| 948860 | 8/1949 | France | 294/58 |
| 1109731 | 2/1956 | France | 294/58 |
| 2481870 | 11/1981 | France | 294/58 |

*Primary Examiner*—Johnny D. Cherry
*Attorney, Agent, or Firm*—Henderson & Sturm

[57]  ABSTRACT

A dual handled implement device 10 including a main handle unit 11 and an auxiliary handle unit 12 pivotally connected to one another by a linkage unit 13 which is pivotally connected on one end to the main handle unit 11 and which is pivotally connected on the other end to the auxiliary handle unit 12.

4 Claims, 3 Drawing Sheets

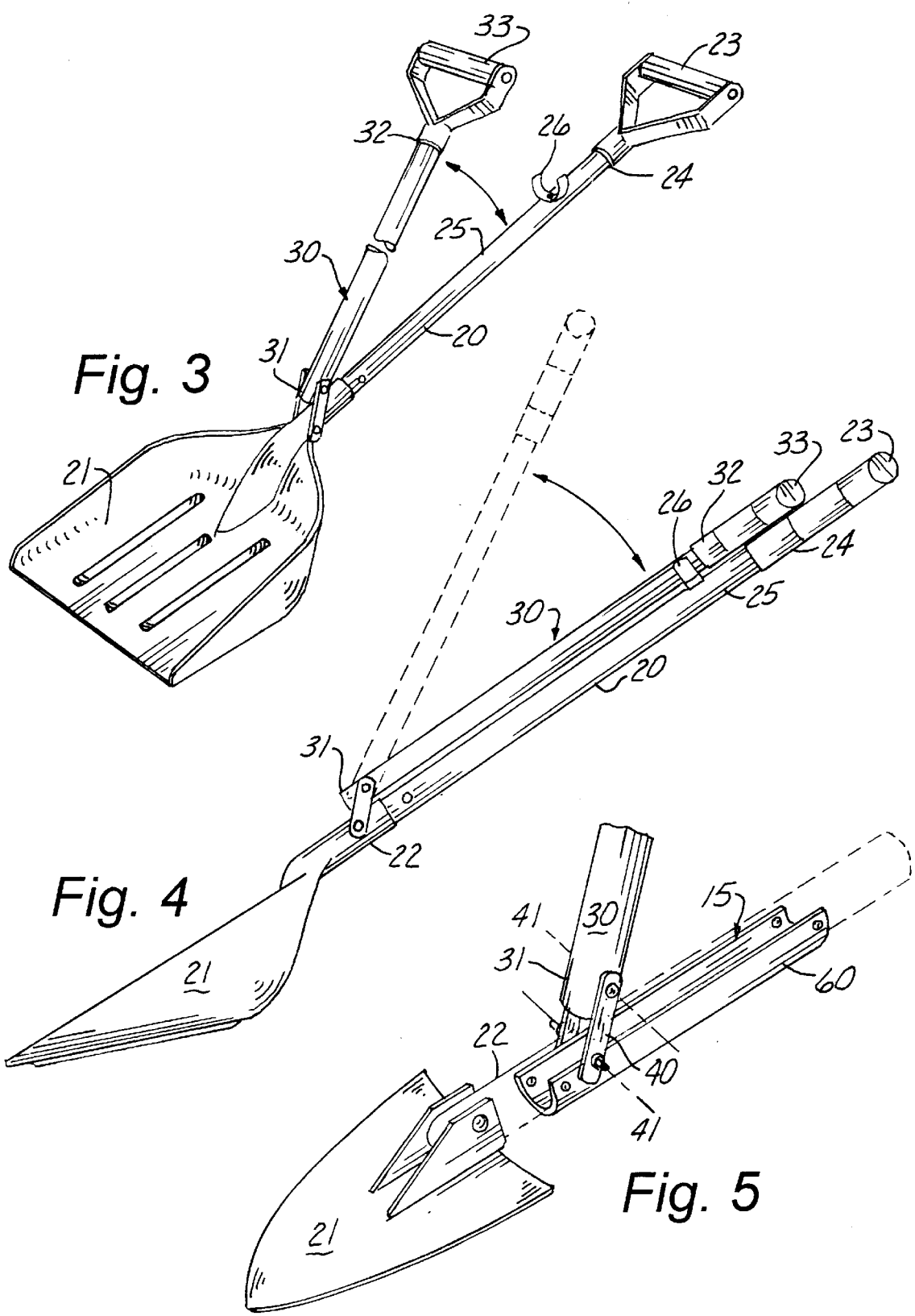

DUAL HANDLED SHOVEL

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of dual handled implements in general, and in particular to a dual handled implement provided with a double pivoted linkage arrangement.

2. Description of Related Art

As can be seen by reference to the following U.S. Pat. Nos. 2,772,910; 4,050,728; 4,229,033; and 4,615,553, the prior art is replete with myriad and diverse dual handled implements such as shovels and the like.

While all of the aforementioned prior art constructions are more than adequate for the basic purpose and function for which they have been specifically designed, they are uniformly deficient with respect to their failure to provide a simple, efficient, and practical dual handled shovel device that has a degree of articulated movement that is not possible with the simple pivoted shovel.

As shown in the prior art constructions, all of the pivoted connections employed in the past have focused on a single point pivoted connection that is either centered on the handle of the implement or at a point located above the implement handle which unduly limits the range of motion of the auxiliary handle relative to the main handle.

As a consequence of the foregoing situation, there has existed a longstanding need for a new and improved double handled shovel construction wherein a double pivoted linkage arm forms the operative connection between the main handle and the auxiliary handle, and the provision of such a construction is a stated objective of the present invention.

BRIEF SUMMARY OF THE INVENTION

Briefly stated, the dual handled shovel device that forms the basis of the present invention comprises in general, a main handle unit, an auxiliary handle unit, a linkage unit for connecting the main handle unit to the auxiliary handle unit, and an optional mounting unit for attaching the linkage unit to the main handle.

As will be explained in greater detail further on in the specification, the main handle unit comprises an elongated handle member having an implement head formed on its lower end. The auxiliary handle unit comprises a somewhat shorter handle member which is pivotally secured to the main handle member and the linkage unit is pivotally associated on its opposite ends with both the main and the auxiliary handle units. The auxiliary handle unit will have an articulated movement relative to the main handle unit.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 3 is an isolated perspective view of the device;

FIG. 4 is a side elevation view of the device;

FIG. 5 is an isolated detail view of an alternate version of the device;

DETAILED DESCRIPTION OF THE INVENTION

Figure 1:
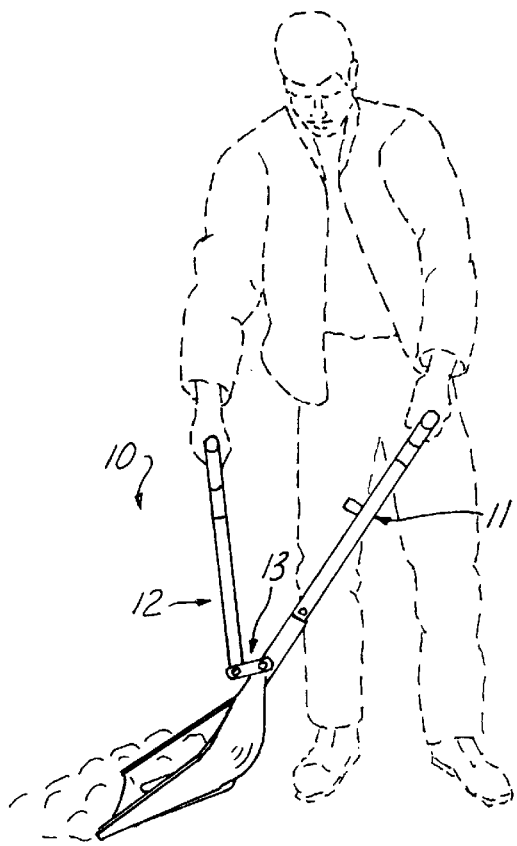
FIG. 1 is a perspective view of the double handled shovel device in the act of shoveling snow.

As can be seen by reference to the drawings, and in particularly to FIG. 1, the double handled shove device that forms the basis of the present invention is designated generally by the reference number 10. The device 10 comprises in general, a main handle unit 11, an auxiliary handle unit 12, and a linkage unit 13. These units will now be described in seriatim fashion.

As shown in FIGS. 3 through 5, the main handle unit 11 comprises an elongated main handle member 20 having an implement head 21 such as a shovel or the like formed on one end 22 and a conventional hand grip element 23 formed on the other end 24 wherein the intermediate portion 25 of the main handle member 20 may further be optionally provided with a clip element 26 whose purpose and function will be described presently.

Still referring to FIGS. 3 through 5, it can be seen that the auxiliary handle unit 12 comprises a generally truncated auxiliary handle member 30 having a lower end 31 and an upper end 32 provided with a hand grip element 33 and dimensioned to be releasable engaged by the clip member 26 on the main handle member 20.

Figure 6:
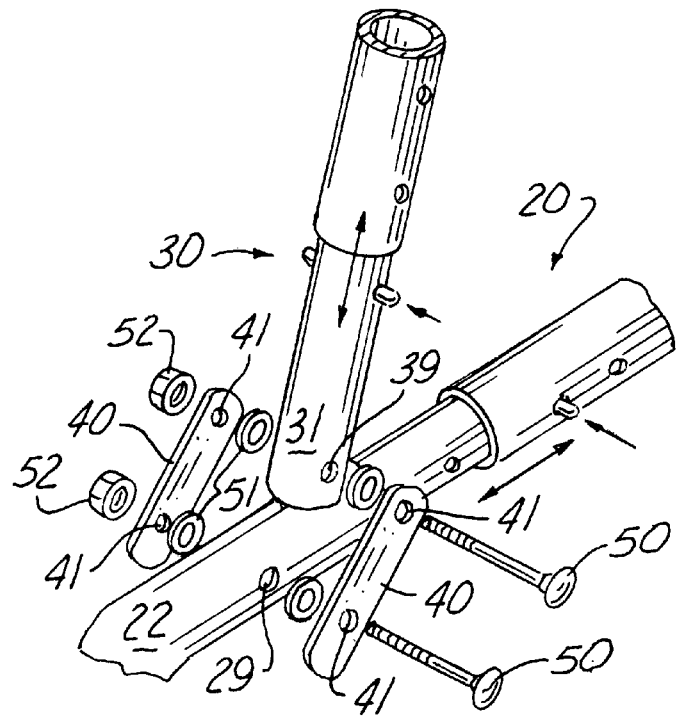
FIG. 6 is an exploded perspective view of the linkage unit.

As can best be seen by reference to FIGS. 5 and 6, the linkage unit 13 comprises in general, a pair of elongated link members 40 provided with apertures 41 on their upper and lower ends. The upper end of each link member 40 is adapted to be pivotally connected to the lower end 31 of the auxiliary handle member 30. The lower end of each link member 40 is adapted to be pivotally associated with the lower end 22 of the main handle member 20.

As can also be seen by reference to FIG. 6, the pivoted connection between the link members 40 and the handle members 20 and 30 is accomplished by a pair of conventional pivot rod members 50 dimensioned to be received in apertures 29 and 39 formed in the handle members 20 and 30 and further provided with washers 51 and fastening elements 52 in a well recognized fashion.

Figure 2:
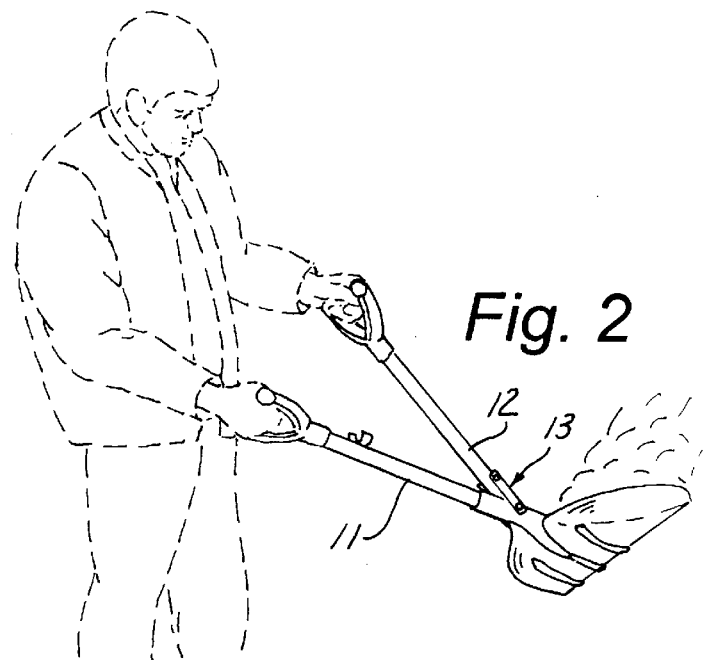
FIG. 2 is a perspective view of the double handled shovel device in the act of pitching the accumulated snow.

In one version of the preferred embodiment depicted in FIGS. 1 and 2, the lower ends of the linkage members 40 are pivotally connected to both the lower end of the main handle member 20 and the shank portion of the implement head 21.

In another version of the preferred embodiment shown in FIG. 5, the lower ends of the linkage members 40 are pivotally connected to an intermediate connector unit 15 which is operatively attached to the lower end 22 of the main handle member 20. The intermediate connector unit 15 comprises a split sleeve connector member 60 which is fixedly secured to the lower end 22 of the main handle member 20.

Finally, as shown in FIG. 6, the linkage members 40 are directly connected to the lower end 22 of the main handle member 20 as previously described herein.

Figure 7:
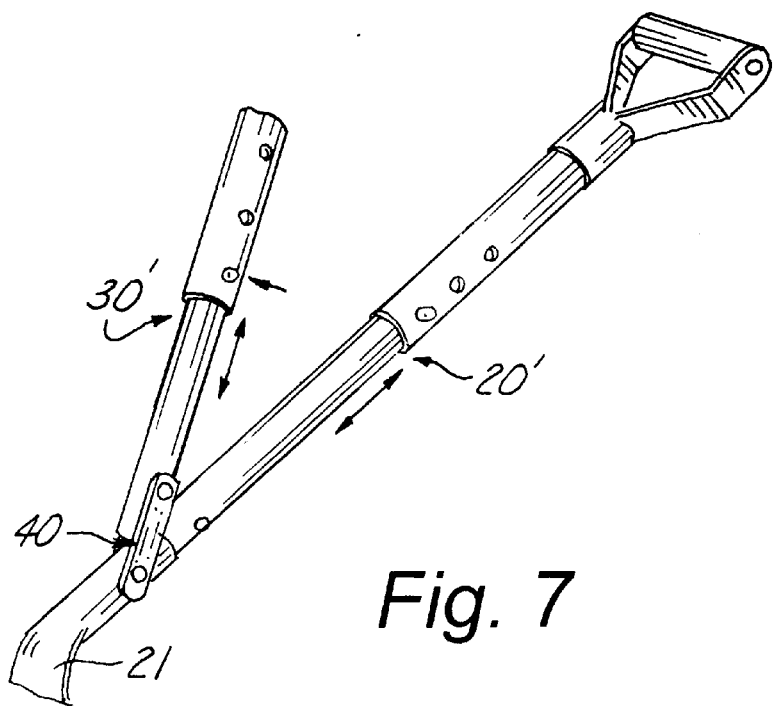
FIG. 7 is an isolated detail view of another alternate version of the device.

As can also be seen by reference to FIG. 7, this invention also contemplates the substitution of adjustable length main 20' and auxiliary 30' handle members for the rigid handle members 20 and 30 previously described herein. However, it is to be understood that the main focus of this invention is the provision of the double pivoted linkage members 40 to allow the articulated pivotal movement of the auxiliary handle member 30 relative to the main handle member 20 as described herein.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooded parts together, whereas, a screw employs a helical surface, in the environment of fastening wooden parts, a nail and a screw may be equivalent structures.

I claim:

1. A double handled implement device consisting of:
   a main handle unit including an elongated main handle member having an upper end and a lower end provided with an implement head;
   an auxiliary handle unit including a generally truncated auxiliary handle member having a lower end and an upper end; and
   a linkage unit operatively and pivotally associated with the lower ends of both the main handle unit and the auxiliary handle member wherein the linkage unit consists of a pair of rigid link members having upper ends pivotally connected to the lower end of the auxiliary handle member and having lower ends that are pivotally connected to the lower end of the main handle member.

2. The device as in claim 1 wherein at least one of the main and auxiliary handle members is adjustable in length.

3. The device as in claim 1 wherein both of the main and auxiliary handle members are adjustable in length.

4. A double handled implement device consisting of:
   a main handle unit including an elongated main handle member having an upper end and a lower end provided with a split sleeve connector member and an implement head;
   an auxiliary handle unit including a generally truncated auxiliary handle member having a lower end and an upper end; and
   a linkage unit operatively and pivotally associated with the lower ends of both the main handle unit and the auxiliary handle member wherein the linkage unit consists of a pair of rigid link members having upper ends and lower ends wherein the upper ends of the link members are pivotally connected to the lower end of the auxiliary handle member and the lower ends of the link members are pivotally connected to the split sleeve connector member.

\* \* \* \* \*